US 11,377,012 B2

(12) United States Patent
Herman et al.

(10) Patent No.: US 11,377,012 B2
(45) Date of Patent: Jul. 5, 2022

(54) SILO TRANSPORT SAFE RETRIEVAL SYSTEM

(71) Applicant: Quickthree Technology LLC, Yardley, PA (US)

(72) Inventors: Alvin Herman, Saskatoon (CA); Erin Herman, Clavet (CA)

(73) Assignee: Quickthree Technology, LLC, Yardley, PA (US)

( * ) Notice: Subject to any disclaimer, the term of this patent is extended or adjusted under 35 U.S.C. 154(b) by 1 day.

(21) Appl. No.: 17/046,778

(22) PCT Filed: Apr. 5, 2019

(86) PCT No.: PCT/US2019/025924
§ 371 (c)(1),
(2) Date: Oct. 10, 2020

(87) PCT Pub. No.: WO2019/199588
PCT Pub. Date: Oct. 17, 2019

(65) Prior Publication Data
US 2021/0114502 A1    Apr. 22, 2021

(30) Foreign Application Priority Data
Apr. 12, 2018    (CA) ...................... 3001219

(51) Int. Cl.
*B60P 1/16*    (2006.01)
*B60P 1/64*    (2006.01)
(Continued)

(52) U.S. Cl.
CPC ............. *B60P 1/162* (2013.01); *B60P 1/6418* (2013.01); *B60P 3/2245* (2013.01); *B65D 88/30* (2013.01)

(58) Field of Classification Search
CPC ...... B60P 1/04; B60P 1/48; B60P 1/64; B60P 1/6463; B60P 1/486; B60P 1/28;
(Continued)

(56) References Cited

U.S. PATENT DOCUMENTS 4,621,972 A * 11/1986 Grotte ....................... B60P 1/64
280/414.5
4,775,275 A * 10/1988 Perry .................... B28C 7/0495
366/18
(Continued)

FOREIGN PATENT DOCUMENTS

| CA | 2851290 | 7/2017 |
|----|---------|--------|
| EP | 1600643 | 11/2005 |
| WO | 2016178691 | 11/2016 |

OTHER PUBLICATIONS

International Search Report and Written Opinion for PCT/US19/25924 dated Jul. 30, 2019.

*Primary Examiner* — Kaitlin S Joerger
(74) *Attorney, Agent, or Firm* — Sheehan Phinney Bass & Green PA (57) ABSTRACT

A silo transport system includes a vehicle and a silo configured to store material when in a vertical orientation supported on the ground surface, and to be transported in a horizontal orientation on the vehicle. The vehicle includes a pivoting cradle supporting the silo in the horizontal orientation and a lock to releasably attach the cradle to the silo. A cradle controller pivots the cradle from a lowered position to a raised position where the silo is in the vertical orientation resting on the ground surface. When the cradle is attached to the silo, the cradle controller pivots the cradle away from the raised position to the lowered position when the silo attached to the cradle is empty, and is inoperative to pivot the cradle away from the raised position toward the (Continued)

lowered position when the silo attached to the cradle contains greater than a threshold amount of the material.

21 Claims, 4 Drawing Sheets

(51) Int. Cl.
 *B60P 3/22* (2006.01)
 *B65D 88/30* (2006.01)
(58) Field of Classification Search
 CPC ...... B60P 3/16; B60P 3/22; B60P 3/40; B62D 33/00; B62D 63/06; B65D 88/56; B66F 9/06; Y10S 414/132
 See application file for complete search history.

(56) References Cited

U.S. PATENT DOCUMENTS

| | | | | |
|---|---|---|---|---|
| 4,944,646 A * | 7/1990 | Edwards | ............... | B28C 9/0418 |
| | | | | 280/6.157 |
| 4,954,036 A | 9/1990 | Walker | | |
| 6,282,890 B1 * | 9/2001 | Takano | ................ | E02F 9/2203 |
| | | | | 60/420 |
| 7,214,028 B2 | 5/2007 | Boasso et al. | | |
| 7,858,888 B2 * | 12/2010 | Lucas | .................... | G01G 19/12 |
| | | | | 177/136 |
| 8,142,134 B2 * | 3/2012 | Lavoie | ..................... | B60P 1/00 |
| | | | | 414/812 |
| 9,428,094 B2 | 8/2016 | Herman et al. | | |
| 9,428,348 B2 * | 8/2016 | Teichrob | ................ | B65G 67/40 |
| 9,499,335 B2 * | 11/2016 | McIver | ..................... | B60P 3/00 |
| 9,878,651 B2 | 1/2018 | Herman et al. | | |
| 10,077,610 B2 * | 9/2018 | Pham | ...................... | E21B 41/00 |
| 10,150,612 B2 * | 12/2018 | Pham | ..................... | B65D 88/32 |
| 10,294,045 B2 * | 5/2019 | Lucas | ................... | B65D 88/30 |
| 10,300,830 B2 * | 5/2019 | McIver | .................. | B65D 88/32 |
| 10,384,918 B2 * | 8/2019 | Nagge | ....................... | B66F 3/24 |
| 10,457,504 B2 * | 10/2019 | Herman | ................ | B65G 17/126 |
| 10,618,725 B2 * | 4/2020 | Pham | ..................... | B65D 88/30 |
| 2005/0260062 A1 * | 11/2005 | Boasso | ................ | B60P 1/6427 |
| | | | | 414/332 |
| 2010/0071284 A1 * | 3/2010 | Hagan | ..................... | E21B 41/00 |
| | | | | 52/192 |
| 2012/0024738 A1 * | 2/2012 | Herman | .................. | B60P 1/486 |
| | | | | 206/459.1 |
| 2012/0134772 A1 * | 5/2012 | Herman | ................ | B60P 1/6463 |
| | | | | 414/808 |
| 2013/0108402 A1 * | 5/2013 | Herman | ................ | B60P 1/6427 |
| | | | | 414/332 |
| 2014/0041319 A1 | 2/2014 | Pham et al. | | |
| 2014/0169920 A1 * | 6/2014 | Herman | ................... | B60P 3/40 |
| | | | | 414/483 |
| 2015/0044004 A1 * | 2/2015 | Pham | ..................... | B65G 67/24 |
| | | | | 414/332 |
| 2017/0313499 A1 | 11/2017 | Hughes et al. | | |

\* cited by examiner

FIG. 10

SILO TRANSPORT SAFE RETRIEVAL SYSTEM

CROSS-REFERENCE TO RELATED APPLICATIONS

This application is a national phase entry of PCT Application number PCT/US19/25924, filed Apr. 5, 2019 and entitled SILO TRANSPORT SAFE RETRIEVAL SYSTEM, which claims priority to and the benefit of Canadian Patent Application Number 3,001,219, filed Apr. 12, 2018. The applications are hereby incorporated by referenced in their entirety.

FIELD OF INVENTION

This invention is in the field of transportable containers such as silos, bins, tanks, or the like, and in particular such containers that are vertically oriented when installed at a work site and moved to a horizontal orientation on a vehicle for transport.

BACKGROUND

In many industries it is required to set up an array of equipment at a temporary work site, and then disassemble the installation, move it to another work site, and re-assemble it. For example asphalt and concrete plants are often set up in locations where large quantities of material are required for road or building construction. Similarly well drilling rigs, such as those drilling for oil and gas, are set up at a drilling location, then taken down and moved to a different drilling location.

These portable plants and rigs typically include various tanks, bins, silos, and like containers for water, asphalt, sand, cement, and other materials such as might be required at any particular work site. These are transported to the work site, commonly in a lowered horizontal transport orientation, and then raised to a vertical working orientation at the work site. These containers are typically transported to the work site by vehicles such as flatbed trucks or trailers in a lowered horizontal transport orientation. The vehicle is maneuvered into position, and then the container is raised from the horizontal transport position to a vertical working position resting on the ground, and the vehicle is moved away from the site. Such a transport system is disclosed for example in U.S. Pat. No. 9,428,094 to Herman et al. and U.S. Pat. No. 7,214,028 to Boasso et al.

To retrieve a silo that is in a vertical working orientation, a vehicle is backed up to the silo and a cradle or the like is connected to a vertical silo wall, and then a hydraulic cylinder exerts a force on the cradle and silo to pivot same downward to a horizontal orientation lying on the vehicle bed.

These transport systems for erecting and retrieving a silo are designed to work when the silo is empty. Granular material is deposited into and removed from the silo while it is in the vertical working orientation. Problems arise if the silo is not empty when the retrieval procedure is initiated, as the weight of a partially loaded silo will be excessive. The hydraulic cylinder can exert sufficient force to tip the silo from the vertical orientation toward the horizontal orientation, however once tipped the added weight, in the worst case, can overcome the hydraulic cylinder such that the silo may fall onto the vehicle causing a hazardous situation.

Even if the descent to horizontal is safely accomplished, the vehicle can be significantly overloaded, causing damage to the vehicle. Even in the best case where no damage is incurred, the vehicle will typically be overloaded to the extent it cannot be safely or legally moved along roads and the silo will need to be emptied. Moving the silo back to the vertical orientation may not be possible because of its excessive weight. Emptying the tank while it is in the horizontal orientation is typically a difficult and lengthy procedure.

Some silos, for example as disclosed in U.S. Pat. No. 9,878,651 to Herman et al., include two separate compartments, and the presence of some remaining granular material in one of the compartments can be overlooked when sufficient care is not exercised, leading to the above noted problems.

SUMMARY OF THE INVENTION

The present disclosure provides a silo transport system that overcomes problems in the prior art.

In a first embodiment the present disclosure provides a silo transport system comprising a vehicle mounted on wheels for movement along a ground surface. A silo is configured to store material when in a vertical orientation supported on the ground surface, and to be transported in a horizontal orientation on the vehicle. The vehicle includes a pivoting cradle operative to support the silo in the horizontal orientation and a lock operative to releasably attach the cradle to the silo. A cradle controller is operative in a raising mode to pivot the cradle from a lowered position supporting the silo in the horizontal orientation, to a raised position where the silo attached to the cradle is in the vertical orientation resting on the ground surface. When the cradle is attached to the silo, the cradle controller is operative in a lowering mode to pivot the cradle away from the raised position to the lowered position when the silo attached to the cradle is empty, and cradle controller is inoperative to pivot the cradle away from the raised position toward the lowered position when the silo attached to the cradle contains greater than a threshold amount of the material.

In a second embodiment the present disclosure provides a method of transporting a silo for temporary storage of a material therein. The method comprises mounting a vehicle on wheels for movement along a ground surface; pivotally attaching a cradle to the vehicle, and supporting the silo in a horizontal orientation on the vehicle with the cradle in a lowered position and releasably attaching the cradle to the silo; moving the vehicle and silo to a first desired location and operating a cradle controller in a raising mode to pivot the cradle to a raised position where the silo is in a vertical orientation resting on the ground surface; releasing the cradle from the silo and moving the vehicle away from the silo; when it is desired to move the silo to a second desired location, maneuvering the vehicle to a position adjacent to the silo and, with the cradle in the raised position, attaching the cradle to the silo; configuring the cradle controller such that the cradle controller in a lowering mode is operative to pivot the cradle from away from the raised position to the lowered position when the silo attached to the cradle is empty, and such that the cradle controller in the lowering mode is inoperative to pivot the cradle away from the raised position toward the lowered position when the silo contains greater than a threshold amount of the material; operating the cradle controller in the lowering mode; if the cradle pivots away from the raised position to the lowered position supporting the silo in the horizontal orientation on the vehicle, moving the vehicle to the second desired location; if the cradle does not pivot away from the raised position, stopping operation of the cradle controller and removing at least a portion of the material from the silo such that the silo contains less than the threshold amount of the material, and then operating the cradle controller in the lowering mode and pivoting the cradle away from the raised position to the lowered position supporting the silo in the horizontal orientation on the vehicle, and moving the vehicle to the second desired location.

The present disclosure thus provides a system and method for transporting silos in a horizontal orientation on a vehicle to desired locations where the silos are moved to a vertical orientation for temporary storage of a material at the location, and then retrieved to lie in the horizontal orientation on the vehicle for a transport to another location. The system and method reduce the risk of harm and damage during the process of retrieving the silos.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
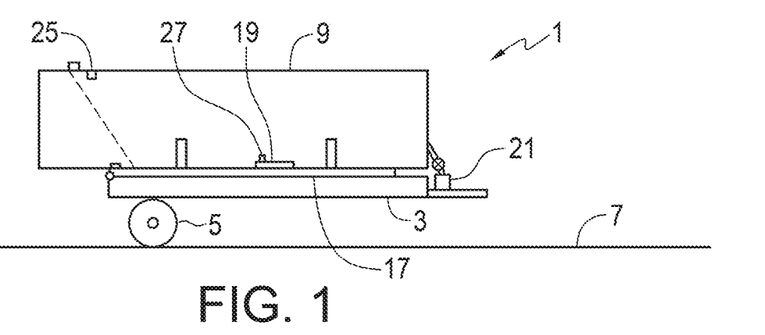
FIG. 1 is a schematic side view of an embodiment of the system of the present disclosure, where material in the silo is sensed with a material sensor inside the silo, and with the silo supported in a horizontal orientation on a pivoting cradle mounted on a vehicle.
Figure 2:
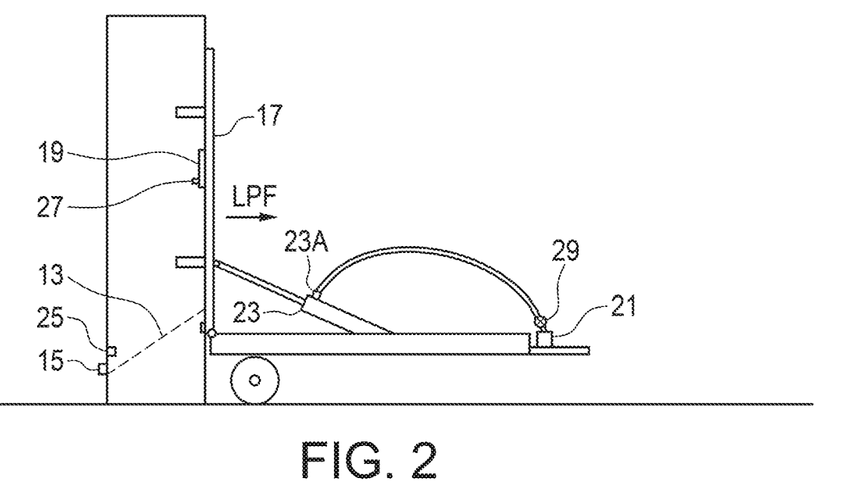
FIG. 2 is a schematic side view of the embodiment of FIG. 1 with the silo supported in a vertical orientation on the ground, and the pivoting cradle in a raised position attached to the silo.
Figure 3:
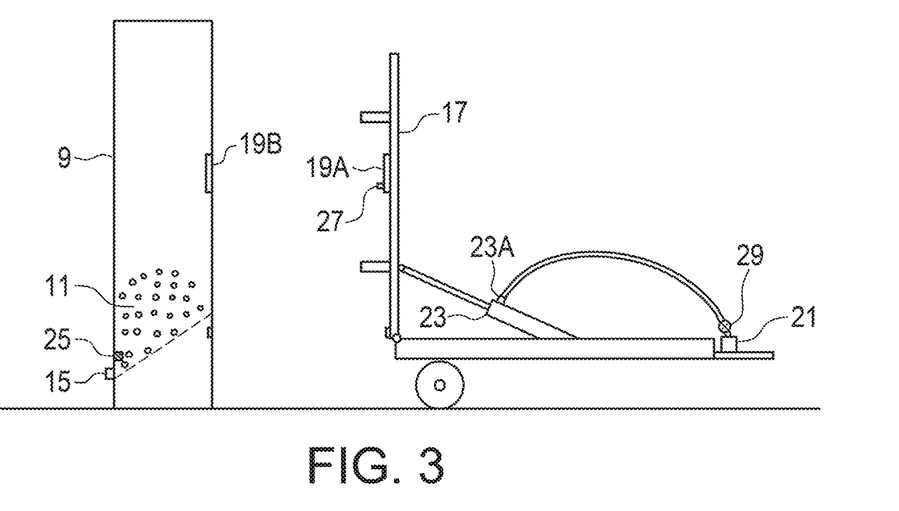
FIG. 3 is a schematic side view of the embodiment of FIG. 1 with the silo supported in a vertical orientation on the ground, and the pivoting cradle in a raised position with the vehicle and cradle removed from the silo.

FIGS. 1-3 schematically illustrate an embodiment of a silo transport system 1 of the present disclosure. The system 1 comprises a vehicle 3 mounted on wheels 5 for movement along a ground surface 7. The vehicle 3 is typically a trailer as illustrated but could also be a flatbed truck or the like. A silo 9 is configured to store material 11, typically granular material, when in a vertical orientation supported on the ground surface 7 as seen in FIG. 3. Typically the silo 9 includes a hoppered floor 13 that slopes to a discharge opening 15. The silo 9 is configured to be transported in a horizontal orientation on the vehicle 3 when empty as seen in FIG. 1.

The vehicle 3 includes a pivoting cradle 17 operative to support the silo 9 in the horizontal orientation and a lock 19 operative to releasably attach the cradle 17 to the silo 9. The lock 19 will typically comprise a first lock portion 19A mounted on the cradle 17 and operative to engage, either automatically as in a latch arrangement or manually, a second lock portion 19B mounted on the silo 9.

A cradle controller 21 is operative in a raising mode to pivot the cradle 17 from a lowered position supporting the silo 9 in the horizontal orientation as seen in FIG. 1, to a raised position where the silo 9 attached to the cradle 17 is in the vertical orientation resting on the ground surface 7 as seen in FIG. 2. FIG. 3 schematically illustrates the cradle 17 in the raised position after the vehicle 3 has been moved away from the vertical silo 9.

The empty cradle 17 is then typically moved to the lowered position by operating the cradle controller 21 in a lowering mode and the vehicle 3 can then be used to transport further silos as desired. The illustrated cradle controller 21 comprises an actuator, illustrated as a hydraulic cylinder 23, that extends and retracts to raise and lower the cradle 17. The cradle controller 21 is operative to control hydraulic fluid flow to the hydraulic cylinder 23.

When the temporary storage of material is finished, the vehicle 3 can then be maneuvered adjacent to the silo 9 to retrieve the silo 9 and move same to the horizontal orientation supported on the cradle 17. A problem can arise if, through carelessness or mishap, material 11 remains in the silo during the retrieval process. Material left in the silo can significantly increase the weight of the silo 9. The hydraulic cylinder 23 may be exerting sufficient lowering force on the cradle 17 to move the cradle from the raised position of FIG. 3 toward the lowered position, however the added weight on the cradle 17 increases as the cradle moves lower such that once the hydraulic cylinder 23 may not be able to support the added weight and the silo and cradle may fall onto the vehicle, causing damage and possibly harming persons nearby.

Even if the descent to horizontal is safely accomplished, the vehicle 3 can be significantly overloaded, causing damage to the vehicle 3. Even in the best case where no damage is incurred, the vehicle 3 will typically be overloaded to the extent it cannot be safely or legally moved along roads and the silo 9 will need to be emptied. Moving the silo 9 back to the vertical orientation to empty it in the usual manner may not be possible because of its excessive weight. Emptying the silo while it is in the horizontal orientation is typically a difficult and lengthy procedure.

To avoid these issues, in the system 1 of the present disclosure, the cradle controller 21 is configured to lower the silo and cradle only when the silo is empty or nearly empty. When the cradle 17 is attached to the silo 9, the cradle controller 21 is operative in the lowering mode to pivot the cradle 17 away from the raised position to the lowered position when the silo 9 attached to the cradle 17 is empty, and cradle controller 21 is inoperative to pivot the cradle 17 away from the raised position toward the lowered position when the silo 9 attached to the cradle 17 contains greater than a threshold amount of the material 11.

The illustrated embodiment of the system 1 of the present disclosure comprises a material sensor 25 in an interior of the silo 9 that is operative to send a negative signal to the cradle controller 21 when a level of the material 11 in the silo 9 indicates an amount of material in the silo 9 that is greater than the threshold amount of the material 11. The cradle controller 21, on receiving the negative signal, is operative to prevent movement of the cradle 17 and attached silo 9 away from the raised position of FIG. 2. The sensor 25 can be connected to the cradle controller 21 by a switch 27 that is activated when the lock 19 attaches the cradle 17 to the silo 9, by wireless transmission, or like connections. Movement can be prevented by closing a valve 29 to prevent pressurized hydraulic fluid from passing into the lowering port 23A of the hydraulic cylinder 23, or by other valve arrangements as are known in the art.

Figure 4:
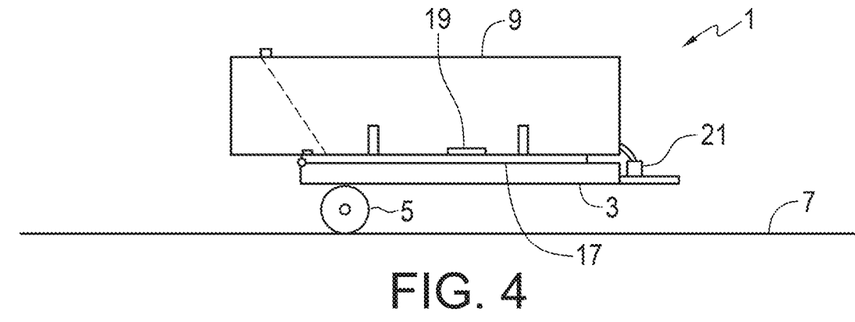
FIG. 4 is a schematic side view of an alternate embodiment of the system of the present disclosure, where the force exerted by the hydraulic cylinder to move the cradle and attached silo from the raised to the lowered position is limited to the force required to move the cradle and attached silo from the raised to the lowered position when the silo is substantially empty, and with the silo supported in a horizontal orientation on a pivoting cradle mounted on a vehicle.
Figure 5:
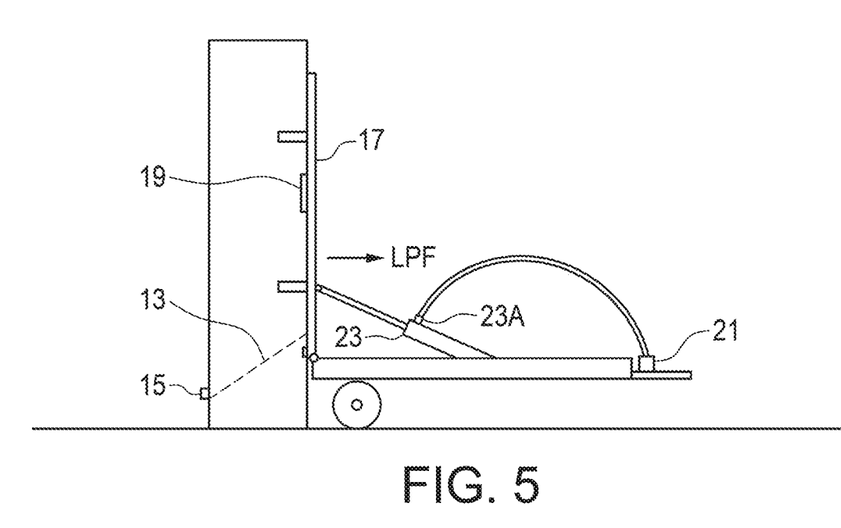
FIG. 5 is a schematic side view of the embodiment of FIG. 4 with the silo supported in a vertical orientation on the ground, and the pivoting cradle in a raised position attached to the silo.
Figure 6:
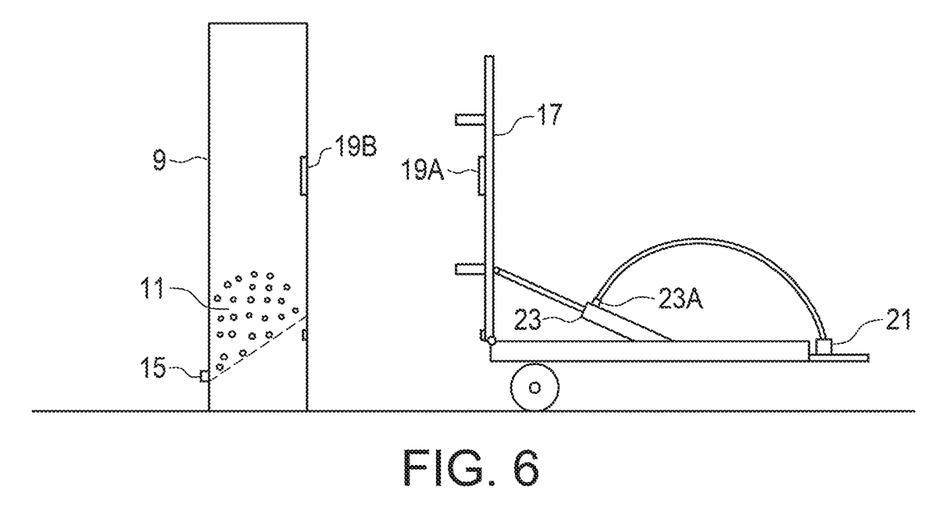
FIG. 6 is a schematic side view of the embodiment of FIG. 4 with the silo supported in a vertical orientation on the ground, and the pivoting cradle in a raised position with the vehicle and cradle removed from the silo.

An alternate version of the system of the present disclosure is schematically illustrated in FIGS. 4-6. The cradle controller 21 here uses a different arrangement for preventing the cradle 17 from pivoting away from the raised position toward the lowered position when the silo 9 attached to the cradle 17 contains greater than a threshold amount of the material 11.

The cradle controller 21 is operative to direct pressurized hydraulic fluid into the lowering port 23A of the hydraulic cylinder 23 at a lowering cylinder pressure to exert a corresponding lowering pivot force LPF directed to move the cradle 17 toward the lowered position, and the lowering pivot force increases as the cylinder pressure increases.

A lowering cylinder pressure directed into the retracting port 23A on the hydraulic cylinder 23 is selected to provide a lowering pivot force LPF, as seen in FIG. 2, that is sufficient to pivot the cradle 17 from the raised position to the lowered position when the silo 9 attached to the cradle 17 is empty, but the lowering pivot force LPF is not sufficient to pivot the cradle 17 away from the raised position toward the lowered position when the silo 9 attached to the cradle 17 contains at least the threshold amount of the material 11. A heavier silo 9 will require a larger lowering pivot force LPF so the selected lowering cylinder pressure can be selected by trial and error. It may be desired to allow this small threshold amount of material to remain in the silo 9 during movement to the lowered position, or the threshold amount may be substantially zero.

Figure 7:
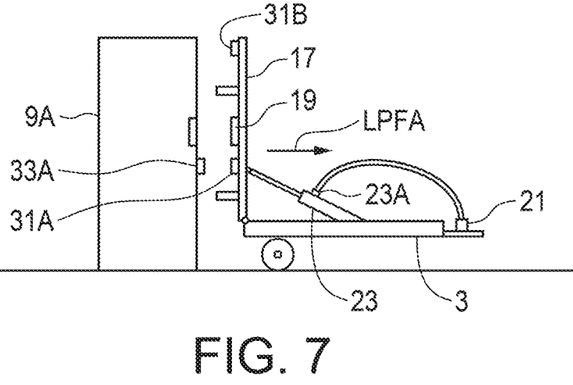
FIG. 7 is a schematic side view of an embodiment of the system of the present disclosure for transporting and retrieving two different sized silos, with a first silo supported in a vertical orientation on the ground, and the pivoting cradle in a raised position with the vehicle and cradle removed from the first silo.
Figure 8:
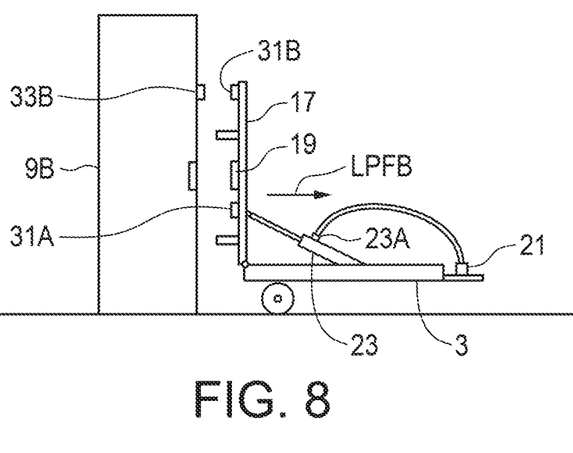
FIG. 8 is a schematic side view of the embodiment of FIG. 7, with a second larger silo supported in a vertical orientation on the ground, and the pivoting cradle in a raised position with the vehicle and cradle removed from the second silo.

It is also known to move silos of various sizes, such as first and second silos 9A and 9B, with the same vehicle 3 and cradle 17 as schematically illustrated in FIGS. 7 and 8. The lowering pivot force LPFA necessary to pivot the smaller silo 9A toward the lowered position will be less than the lowering pivot force LPFB necessary to pivot the smaller silo 9B toward the lowered position.

To accommodate the two different sized silos the cradle controller 21 comprises a first switch 31A that is activated only when the lock 19 attaches the cradle 17 to the first silo 9A and a second switch 31B that is activated only when the lock 19 attaches the cradle to the second silo 9B. In the illustrated silos a protrusion 33A on silo 9A coincides with the first switch 31A and a protrusion 33B on silo 9B coincides with the second switch 31B.

A first lowering cylinder pressure is selected to provide a first lowering pivot force LPFA that is sufficient to pivot the cradle 17 from the raised position to the lowered position when the first silo 9A is attached to the cradle and is empty, and the first lowering pivot force LPFA is not sufficient to pivot the cradle 17 away from the raised position toward the lowered position when the first silo 9A is attached to the cradle 11 and contains at least the threshold amount of the material 11.

A second lowering cylinder pressure is selected to provide a second lowering pivot force LPFB that is sufficient to pivot the cradle 17 from the raised position to the lowered position when the second silo 9B is attached to the cradle 17 and is empty, and the second lowering pivot force LPFB is not sufficient to pivot the cradle 17 away from the raised position toward the lowered position when the second silo 9B is attached to the cradle 17 and contains at least the threshold amount of the material 11.

The cradle controller 21 in the lowering mode is operative to direct pressurized hydraulic fluid into the lowering port 23A of the hydraulic cylinder 23 at the first lowering cylinder pressure when the first switch 31A is activated, and is operative to direct pressurized hydraulic fluid into the lowering port 23A of the hydraulic cylinder 23 at the second lowering cylinder pressure when the second switch 31B is activated.

Figure 9:
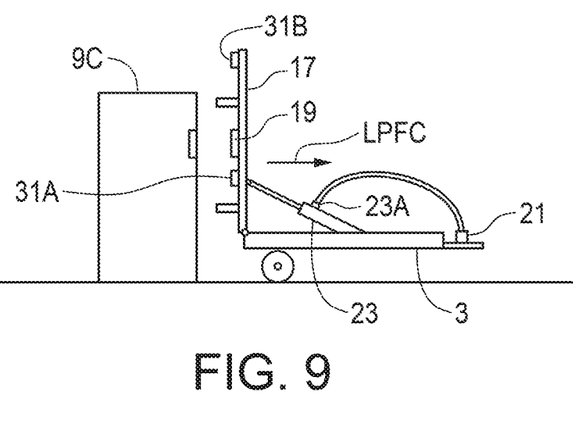
FIG. 9 is a schematic side view of the embodiment of FIG. 7, with a third smaller silo supported in a vertical orientation on the ground, and the pivoting cradle in a raised position with the vehicle and cradle removed from the third silo.

The cradle controller 21 comprises a hydraulic circuit 35 connecting the hydraulic cylinder to a pressurized hydraulic fluid source 37 as schematically illustrated in FIG. 9. The hydraulic circuit 35 comprises a first pressure relief valve 39A operative, when the first switch 31A is activated, to direct pressurized hydraulic fluid from the hydraulic fluid source 37 into the lowering port 23A of the hydraulic cylinder 23 until the cylinder pressure exceeds the first lowering cylinder pressure, and the first pressure relief valve 39A is operative to direct hydraulic fluid away from the lowering port 23A of the hydraulic cylinder 23 through relief conduit 41A back to the pressurized hydraulic fluid source 37 when the cylinder pressure exceeds the first lowering cylinder pressure.

The hydraulic circuit 35 further comprises a second pressure relief valve 39B operative, when the second switch is activated, to direct pressurized hydraulic fluid into the lowering port 23A of the hydraulic cylinder 23 until the cylinder pressure exceeds the second lowering cylinder pressure, and the second pressure relief valve 39A is operative to direct hydraulic fluid away from the lowering port 23A of the hydraulic cylinder 23 through relief conduit 41B back to the pressurized hydraulic fluid source when the cylinder pressure exceeds the second lowering cylinder pressure.

The hydraulic circuit 35 thus keeps the force exerted by the hydraulic cylinder 23 at or below the first lowering pivot force LPFA when the first switch 31A is activated, and keeps the force exerted by the hydraulic cylinder 23 at or below the second lowering pivot force LPFA when the second switch 31B is activated. It is contemplated that other arrangements to limit the pressure of hydraulic fluid at the lowering port 23A of the hydraulic cylinder 23 to a selected level could be used as well.

Figure 10:
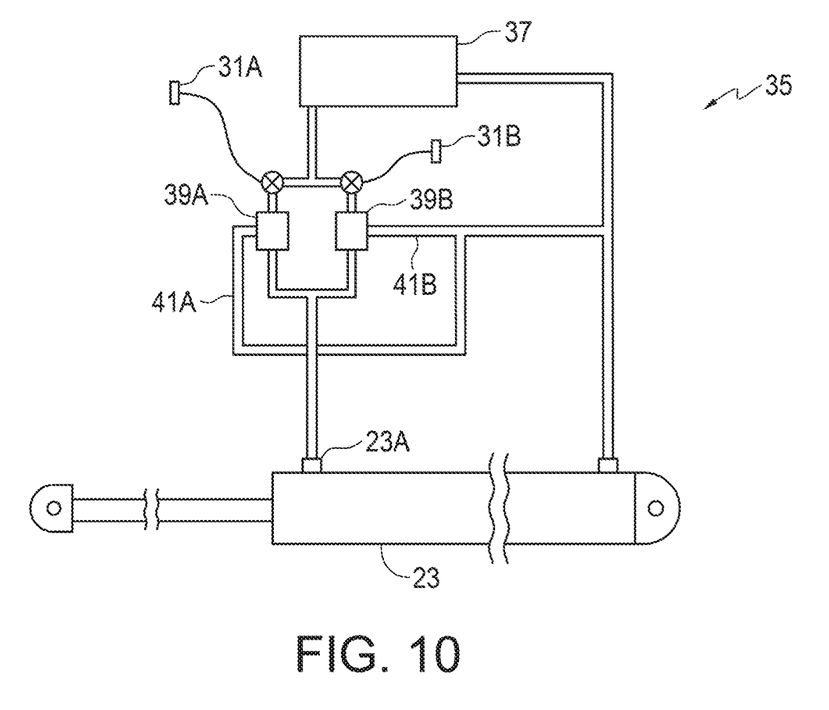
FIG. 10 is a schematic view of a hydraulic circuit with pressure relief valves for restricting the lowering pivot force exerted by the hydraulic cylinder.

The hydraulic circuit 35 can be modified as required to accommodate a vehicle 3 and cradle 17 that is required to carry 3, 4, or more different silos 9 by adding switches and pressure relief valves accordingly. Where the vehicle 3 is required to carry a wide variety of silos including some relatively small silos a default setting can be provided, for example, as schematically illustrated in FIG. 10, where a third silo 9C is smaller and has a weight less than a weight of either of the first and second silos 9A, 9B. The third silo 9C will typically be the smallest silo contemplated to be carried by the vehicle 3.

In the version of FIG. 10, when the lock 19 attaches the cradle 17 to the third silo 9C, the first and second switches 31A, 31B are not activated and the cradle controller 21 in the lowering mode is operative to direct pressurized hydraulic fluid into the hydraulic cylinder 23 at a third lowering cylinder pressure that is less than the first and second lowering cylinder pressures, and that exerts a third lowering pivot force LPFC that is sufficient to pivot the cradle 17 away from the raised position toward the lowered position when the third silo 9C is attached to the cradle 17 and is empty, but is insufficient to pivot the cradle 17 away from the raised position toward the lowered position when the silo 9C attached to the cradle 17 contains at least the threshold amount of the material 11.

The threshold amount of material may be somewhat different for each of the first, second, and third silos 9A, 9B, 9C but in any event will be small.

The present disclosure further discloses a method of transporting a silo 9 for temporary storage of a material 11 therein. The method comprises mounting a vehicle 3 on wheels 5 for movement along a ground surface 7; pivotally attaching a cradle 17 to the vehicle 3, and supporting the silo 9 in a horizontal orientation on the vehicle 3 with the cradle 17 in a lowered position and releasably attaching the cradle 17 to the silo 9; moving the vehicle 3 and silo 9 to a first desired location and operating a cradle controller 21 in a raising mode to pivot the cradle 17 to a raised position where the silo 9 is in a vertical orientation resting on the ground surface 7; releasing the cradle 17 from the silo 9 and moving the vehicle 3 away from the silo 9; when it is desired to move the silo 9 to a second desired location, maneuvering the vehicle 3 to a position adjacent to the silo 9 and, with the cradle 17 in the raised position, attaching the cradle 17 to the silo 9; configuring the cradle controller 21 such that the cradle controller 21 in a lowering mode is operative to pivot the cradle 17 from away from the raised position to the lowered position when the silo 9 attached to the cradle 17 is empty, and such that the cradle controller 21 in the lowering mode is inoperative to pivot the cradle 17 away from the raised position toward the lowered position when the silo 9 contains greater than a threshold amount of the material 11; operating the cradle controller 21 in the lowering mode; if the cradle 17 pivots away from the raised position to the lowered position supporting the silo 9 in the horizontal orientation on the vehicle 3, moving the vehicle 3 to the second desired location; if the cradle 17 does not pivot away from the raised position, stopping operation of the cradle controller 21 and removing at least a portion of the material 11 from the silo 9 such that the silo 9 contains less than the threshold amount of the material 11; operating the cradle controller 21 in the lowering mode and pivoting the cradle 17 away from the raised position to the lowered position supporting the silo 9 in the horizontal orientation on the vehicle 3, and then moving the vehicle 3 to the second desired location.

The present disclosure thus provides a system and method for transporting silos in a horizontal orientation on a vehicle to desired locations where the silos are moved to a vertical orientation for temporary storage of a material at the location, and then retrieved to lie in the horizontal orientation on the vehicle for a transport to another location. The system and method reduce the risk of harm and damage during the process of retrieving the silos.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A silo transport system comprising:
    a vehicle mounted on wheels for movement along a ground surface;
    a silo configured to store material when in a vertical orientation supported on the ground surface, and to be transported in a horizontal orientation on the vehicle;
    wherein the vehicle includes a pivoting cradle operative to support the silo in the horizontal orientation and a lock operative to releasably attach the cradle to the silo;
    a cradle controller operative in a raising mode to pivot the cradle from a lowered position supporting the silo in the horizontal orientation, to a raised position where the silo attached to the cradle is in the vertical orientation resting on the ground surface;
    wherein when the cradle is attached to the silo, the cradle controller is operative in a lowering mode to pivot the cradle away from the raised position to the lowered position when the silo attached to the cradle is empty, and cradle controller is inoperative to pivot the cradle away from the raised position toward the lowered position when the silo attached to the cradle contains greater than a threshold amount of the material;
    a material sensor in an interior of the silo and operative to send a negative signal to the cradle controller when a level of the material in the silo indicates an amount of material in the silo that is greater than the threshold amount of the material, and wherein the cradle controller on receiving the negative signal is operative to prevent movement of the cradle and attached silo away from the raised position,
    wherein the material sensor is connected to the cradle controller by a switch that is activated when the lock attaches the cradle to the silo.

2. The system of claim 1 wherein the cradle controller comprises a hydraulic cylinder and the cradle controller is operative to control hydraulic fluid flow to the hydraulic cylinder.

3. The system of claim 1 wherein the cradle controller comprises a hydraulic cylinder, and the cradle controller is operative to direct pressurized hydraulic fluid into a lowering port of the hydraulic cylinder at a lowering cylinder pressure to exert a corresponding lowering pivot force directed to move the cradle toward the lowered position, and wherein the lowering pivot force increases as the lowering cylinder pressure increases.

4. The system of claim 3 wherein a lowering cylinder pressure is selected to provide a lowering pivot force that is sufficient to pivot the cradle from the raised position to the lowered position when the silo attached to the cradle is empty, and wherein the lowering pivot force is not sufficient to pivot the cradle away from the raised position toward the lowered position when the silo attached to the cradle contains at least the threshold amount of the material.

5. The system of claim 4 wherein the cradle controller comprises a hydraulic circuit connecting the hydraulic cylinder to a pressurized hydraulic fluid source, and wherein the hydraulic circuit comprises a pressure relief valve operative to direct pressurized hydraulic fluid into the hydraulic cylinder until the cylinder pressure exceeds the lowering cylinder pressure, and wherein the pressure relief valve is operative to direct hydraulic fluid away from the hydraulic cylinder back to the pressurized hydraulic fluid source when the cylinder pressure exceeds the lowering cylinder pressure.

6. The system of claim 3 comprising:
first and second silos;
wherein a first lowering cylinder pressure is selected to provide a first lowering pivot force that is sufficient to pivot the cradle from the raised position to the lowered position when the first silo is attached to the cradle and is empty, and wherein the first lowering pivot force is not sufficient to pivot the cradle away from the raised position toward the lowered position when the first silo is attached to the cradle and contains at least the threshold amount of the material;
wherein a second lowering cylinder pressure is selected to provide a second lowering pivot force that is sufficient to pivot the cradle from the raised position to the lowered position when the second silo is attached to the cradle and is empty, and wherein the second lowering pivot force is not sufficient to pivot the cradle away from the raised position toward the lowered position when the second silo is attached to the cradle and contains at least the threshold amount of the material.

7. The system of claim 6 wherein the cradle controller comprises:
a first switch that is activated only when the lock attaches the cradle to the first silo and a second switch that is activated only when the lock attaches the cradle to the second silo;
wherein the cradle controller in the lowering mode is operative to direct pressurized hydraulic fluid into the hydraulic cylinder at the first lowering cylinder pressure when the first switch is activated; and
wherein the cradle controller in the lowering mode is operative to direct pressurized hydraulic fluid into the hydraulic cylinder at the second lowering cylinder pressure when the second switch is activated.

8. The system of claim 7 wherein the cradle controller comprises a hydraulic circuit connecting the hydraulic cylinder to a pressurized hydraulic fluid source, and wherein:
the hydraulic circuit comprises a first pressure relief valve operative, when the first switch is activated, to direct pressurized hydraulic fluid into the hydraulic cylinder until the cylinder pressure exceeds the first lowering cylinder pressure, and wherein the first pressure relief valve is operative to direct hydraulic fluid away from the hydraulic cylinder back to the pressurized hydraulic fluid source when the cylinder pressure exceeds the first lowering cylinder pressure;
the hydraulic circuit comprises a second pressure relief valve operative, when the second switch is activated, to direct pressurized hydraulic fluid into the hydraulic cylinder until the cylinder pressure exceeds the second lowering cylinder pressure, and wherein the second pressure relief valve is operative to direct hydraulic fluid away from the hydraulic cylinder back to the pressurized hydraulic fluid source when the cylinder pressure exceeds the second lowering cylinder pressure.

9. The system of claim 8 comprising a third silo and wherein the third silo has a weight that is less than a weight of either of the first and second silos, and when the lock attaches the cradle to the third silo, the first and second switches are not activated and the cradle controller in the lowering mode is operative to direct pressurized hydraulic fluid into the hydraulic cylinder at a third lowering cylinder pressure that is less than the first and second lowering cylinder pressures.

10. A method of transporting a silo for temporary storage of a material therein, the method comprising:
mounting a vehicle on wheels for movement along a ground surface;
pivotally attaching a cradle to the vehicle, and supporting the silo in a horizontal orientation on the vehicle with the cradle in a lowered position and releasably attaching the cradle to the silo;
moving the vehicle and silo to a first desired location and operating a cradle controller in a raising mode to pivot the cradle to a raised position where the silo is in a vertical orientation resting on the ground surface;
releasing the cradle from the silo and moving the vehicle away from the silo;
when it is desired to move the silo to a second desired location, maneuvering the vehicle to a position adjacent to the silo and, with the cradle in the raised position, attaching the cradle to the silo;
configuring the cradle controller such that the cradle controller in a lowering mode is operative to pivot the cradle away from the raised position to the lowered position when the silo attached to the cradle is empty, and such that the cradle controller in the lowering mode is inoperative to pivot the cradle away from the raised position toward the lowered position when the silo contains greater than a threshold amount of the material;
operating the cradle controller in the lowering mode;
if the cradle pivots away from the raised position to the lowered position supporting the silo in the horizontal orientation on the vehicle, moving the vehicle to the second desired location;
if the cradle does not pivot away from the raised position, stopping operation of the cradle controller and removing at least a portion of the material from the silo such that the silo contains less than the threshold amount of the material, and then operating the cradle controller in the lowering mode and pivoting the cradle away from the raised position to the lowered position supporting the silo in the horizontal orientation on the vehicle, and moving the vehicle to the second desired location.

11. The method of claim 10 comprising providing a material sensor in an interior of the silo and operating the material sensor to send a negative signal to the cradle controller when a level of the material in the silo indicates an amount of material in the silo that is greater than the threshold amount of the material, and wherein the cradle controller on receiving the negative signal is operative to prevent movement of the cradle and attached silo away from the raised position.

12. The method of claim 11 comprising connecting the material sensor to the cradle controller by a switch that is activated when the lock attaches the cradle to the silo.

13. The method of claim 11 wherein the cradle controller comprises a hydraulic cylinder and the cradle controller is operative to control hydraulic fluid flow to the hydraulic cylinder.

14. The method of claim 10 wherein the cradle controller comprises a hydraulic cylinder, and operating the cradle controller directs pressurized hydraulic fluid into the hydraulic cylinder at a cylinder pressure to exert a corresponding cylinder force, and wherein the cylinder force increases as the cylinder pressure increases.

15. The method of claim 14 comprising selecting a lowering cylinder pressure to provide a lowering pivot force that is sufficient to pivot the cradle from the raised position to the lowered position when the silo attached to the cradle is empty, and wherein the lowering pivot force is not sufficient to pivot the cradle away from the raised position toward the lowered position when the silo attached to the cradle contains at least the threshold amount of the material.

16. The method of claim 15 wherein the cradle controller comprises a hydraulic circuit connecting the hydraulic cylinder to a pressurized hydraulic fluid source, and wherein the hydraulic circuit comprises a pressure relief valve operative to direct pressurized hydraulic fluid into the hydraulic cylinder until the cylinder pressure exceeds the lowering cylinder pressure, and wherein the pressure relief valve is operative to direct hydraulic fluid away from the hydraulic cylinder back to the pressurized hydraulic fluid source when the cylinder pressure exceeds the lowering cylinder pressure.

17. The method of claim 13 for transporting first and second silos, the method comprising:
selecting a first lowering cylinder pressure to provide a first lowering pivot force that is sufficient to pivot the cradle from the raised position to the lowered position when the first silo is attached to the cradle and is empty, and wherein the first lowering pivot force is not sufficient to pivot the cradle away from the raised position toward the lowered position when the first silo is attached to the cradle and contains at least the threshold amount of the material;
selecting a second lowering cylinder pressure to provide a second lowering pivot force that is sufficient to pivot the cradle from the raised position to the lowered position when the second silo is attached to the cradle and is empty, and wherein the second lowering pivot force is not sufficient to pivot the cradle away from the raised position toward the lowered position when the second silo is attached to the cradle and contains at least the threshold amount of the material;
wherein attaching the first silo to the cradle activates a first switch and attaching the second silo to the cradle activates a second switch; and
with the cradle controller in the lowering mode, directing pressurized hydraulic fluid into the hydraulic cylinder at the first lowering cylinder pressure when the first switch is activated; and
with the cradle controller in the lowering mode, directing pressurized hydraulic fluid into the hydraulic cylinder at the second lowering cylinder pressure when the second switch is activated.

18. The method of claim 17 wherein the cradle controller comprises a hydraulic circuit connecting the hydraulic cylinder to a pressurized hydraulic fluid source, and wherein:
the hydraulic circuit comprises a first pressure relief valve operative, when the first switch is activated, to direct pressurized hydraulic fluid into the hydraulic cylinder until the cylinder pressure exceeds the first lowering cylinder pressure, and wherein the first pressure relief valve is operative to direct hydraulic fluid away from the hydraulic cylinder back to the pressurized hydraulic fluid source when the cylinder pressure exceeds the first lowering cylinder pressure;
the hydraulic circuit comprises a second pressure relief valve operative, when the second switch is activated, to direct pressurized hydraulic fluid into the hydraulic cylinder until the cylinder pressure exceeds the second lowering cylinder pressure, and wherein the second pressure relief valve is operative to direct hydraulic fluid away from the hydraulic cylinder back to the pressurized hydraulic fluid source when the cylinder pressure exceeds the second lowering cylinder pressure.

19. A silo transport system comprising:
a vehicle mounted on wheels for movement along a ground surface,
wherein the vehicle includes a pivoting cradle operative to support a silo in a horizontal orientation and a lock operative to releasably attach the cradle to the silo;
a cradle controller operative in a raising mode to pivot the cradle from a lowered position where the silo attached to the cradle is in the horizontal orientation, to a raised position where the silo attached to the cradle is in a vertical orientation resting on the ground surface;
wherein when the cradle is attached to the silo, the cradle controller is operative in a lowering mode to pivot the cradle away from the raised position to the lowered position when the silo attached to the cradle is empty, and cradle controller is inoperative to pivot the cradle away from the raised position toward the lowered position when the silo attached to the cradle contains greater than a threshold amount of the material;
wherein the cradle controller comprises a hydraulic cylinder, and the cradle controller is operative to direct pressurized hydraulic fluid into a lowering port of the hydraulic cylinder at a lowering cylinder pressure to exert a corresponding lowering pivot force directed to move the cradle toward the lowered position, and wherein the lowering pivot force increases as the lowering cylinder pressure increases;
first and second silos, wherein each of the first and second siloes is configured to store material when in the vertical orientation supported on the ground surface, and to be transported when in the horizontal orientation on the vehicle;
wherein a first lowering cylinder pressure is selected to provide a first lowering pivot force that is sufficient to pivot the cradle from the raised position to the lowered position when the first silo is attached to the cradle and is empty, and wherein the first lowering pivot force is not sufficient to pivot the cradle away from the raised position toward the lowered position when the first silo is attached to the cradle and contains at least the threshold amount of the material,
wherein a second lowering cylinder pressure is selected to provide a second lowering pivot force that is sufficient to pivot the cradle from the raised position to the lowered position when the second silo is attached to the cradle and is empty, and wherein the second lowering pivot force is not sufficient to pivot the cradle away from the raised position toward the lowered position when the second silo is attached to the cradle and contains at least the threshold amount of the material, and
wherein the cradle controller comprises:
a first switch that is activated only when the lock attaches the cradle to the first silo and a second switch that is activated only when the lock attaches the cradle to the second silo;

wherein the cradle controller in the lowering mode is operative to direct pressurized hydraulic fluid into the hydraulic cylinder at the first lowering cylinder pressure when the first switch is activated; and wherein the cradle controller in the lowering mode is operative to direct pressurized hydraulic fluid into the hydraulic cylinder at the second lowering cylinder pressure when the second switch is activated.

20. The system of claim 19 wherein the cradle controller comprises a hydraulic circuit connecting the hydraulic cylinder to a pressurized hydraulic fluid source, and wherein:

the hydraulic circuit comprises a first pressure relief valve operative, when the first switch is activated, to direct pressurized hydraulic fluid into the hydraulic cylinder until the cylinder pressure exceeds the first lowering cylinder pressure, and wherein the first pressure relief valve is operative to direct hydraulic fluid away from the hydraulic cylinder back to the pressurized hydraulic fluid source when the cylinder pressure exceeds the first lowering cylinder pressure;

the hydraulic circuit comprises a second pressure relief valve operative, when the second switch is activated, to direct pressurized hydraulic fluid into the hydraulic cylinder until the cylinder pressure exceeds the second lowering cylinder pressure, and wherein the second pressure relief valve is operative to direct hydraulic fluid away from the hydraulic cylinder back to the pressurized hydraulic fluid source when the cylinder pressure exceeds the second lowering cylinder pressure.

21. The system of claim 20 comprising a third silo and wherein the third silo has a weight that is less than a weight of either of the first and second silos, and when the lock attaches the cradle to the third silo, the first and second switches are not activated and the cradle controller in the lowering mode is operative to direct pressurized hydraulic fluid into the hydraulic cylinder at a third lowering cylinder pressure that is less than the first and second lowering cylinder pressures.

* * * * *